(No Model.)
S. A. LUM & J. LISCOM.
WIND WHEEL ATTACHMENT.
No. 415,675. Patented Nov. 19, 1889.
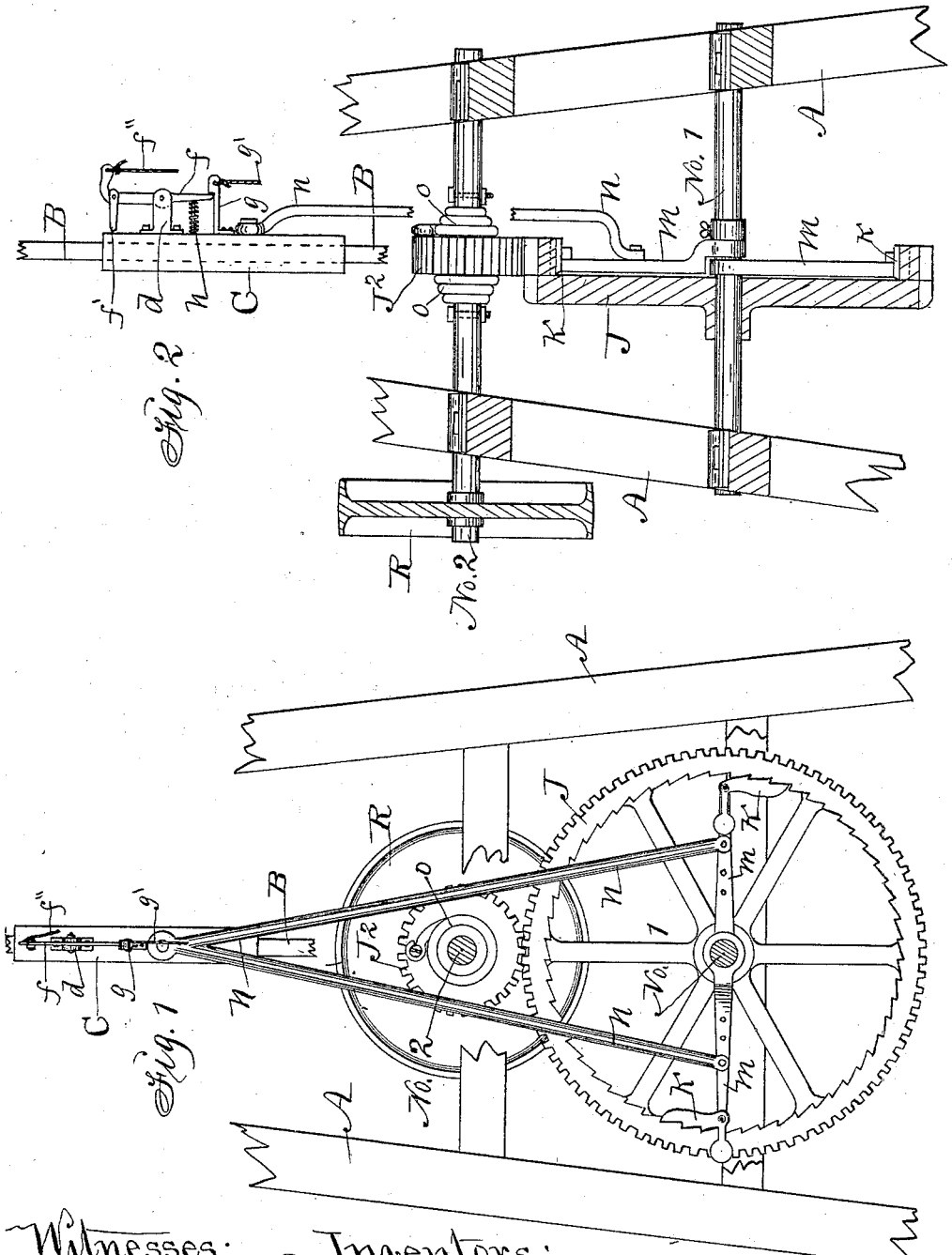
Witnesses:
M. P. Smith.
R. H. Orwig.
Inventors:
Steward A. Lum,
and John Liscom,
By Thomas G. Orwig, Attorney.

UNITED STATES PATENT OFFICE.

STEWARD A. LUM AND JOHN LISCOM, OF RENWICK, IOWA, ASSIGNORS OF ONE-THIRD TO ALEXANDER KITTS, OF SAME PLACE.

WIND-WHEEL ATTACHMENT.

SPECIFICATION forming part of Letters Patent No. 415,675, dated November 19, 1889.

Application filed March 5, 1889. Serial No. 302,036. (No model.)

*To all whom it may concern:*

Be it known that we, STEWARD A. LUM and JOHN LISCOM, citizens of the United States of America, and residents of Renwick, in the county of Humboldt and State of Iowa, have invented a new and useful Attachment for Wind-Wheels, of which the following is a specification.

Heretofore devices for converting motion of various forms have been connected with a wind-motor in various ways.

Our object is, first, to permanently connect mechanism with the vertically-reciprocating rod of a windmill in such a manner that the rod will at all times be thereby connected with our mechanism for converting motion, but readily thrown in and out of gear therewith by the pulling of a cord; second, to prevent the jarring incident to operating machinery by the sudden and irregular motions of a windmill.

Figure 1 is a side view, and Fig. 2 a sectional view in a right-angled position relative to Fig. 1. Jointly considered, they show the construction and application of our complete invention as required for practical use.

A represents the tower of a windmill, and B a pump-rod. Nos. 1 and 2 are rotating shafts in bearings fixed to the tower.

C is a metal sleeve fitted to the pump-rod.

$d$ is a projection formed on or fixed to the sleeve.

$f$ is a lever pivoted to the end of the fulcrum or projection $d$.

$g$ is a spring-catch fixed to the lower portion of the sleeve to engage the lower end of the lever.

$g'$ is a cord attached to the end of the catch in such a manner that a pull on the cord will disengage the latch from the lever.

$f'$ is a pin pivoted to the top of the lever.

$f''$ is a cord fixed to the outwardly-bent top end of the lever in such a manner that a pull on the cord will withdraw the pin from coinciding perforations in the sleeve and pump-rod as required to allow the rod to move up and down while the sleeve remains stationary.

$h$ is a spring fixed to the sleeve and the lever $f$ in such a manner that it will in its normal condition retain the pin $f'$ in the perforations and the rod and sleeve latched together, so that they will move jointly.

J is a gear-wheel fixed to the shaft No. 1. This wheel has an internal ratchet-face that is engaged by pawls $k$, carried on the ends of levers $m$, that are pivoted to the shaft and connected with the sleeve C by means of rods or a frame $n\ n$ in such a manner that when the pump-rod and the sleeve are latched together the wheel J and shaft No. 1 will be rotated.

$J^2$ is a pinion or small gear wheel placed loosely on the shaft No. 2 in such a manner that it will engage the wheel J as required to rotate the shaft No. 2 at a greater speed than the shaft No. 1.

$o\ o$ are springs coiled around the shaft No. 2, and fixed to the opposite sides of the wheel $J^2$, and also to the shaft, in such a manner that they will prevent sudden motions of the windmill from being transmitted to the shaft No. 2 as required to obviate the jarring and concussion incident to machinery operated by means of a windmill.

We are aware that a single coiled spring has been fixed to a rotating shaft and to a flywheel placed loosely on the same shaft. By our combination of two springs with a pinion placed loosely on a rotating shaft to engage a drive-wheel on a parallel shaft the pinion is kept balanced and in true gear with the drive-wheel, and the irregular motion of the reciprocating rod imparted to the drive-wheel is regulated to produce a uniform motion as it is transmitted from the one shaft to the other as required to operate extraneous machinery with greater regularity than has heretofore been accomplished in the use of wind-motors.

R is a belt-wheel on the shaft No. 2, from which power and motion are to be transmitted to extraneous machinery.

To stop the operation of a machine connected with our device, we simply pull down on the cord $f''$ to withdraw the pin $f'$ from the pump-rod and to compress the spring $h$, so as to allow the lower end of the lever $f$ to be engaged by the catch $g$ and the device retained in an unlatched condition as required to allow the pump-rod to move without moving the sleeve and imparting motion to the rotating shafts.

We claim as our invention—

1. A latching device for connecting a reciprocating rod with mechanism for converting the motion of the rod, comprising a sleeve placed on the rod and provided with a perforation at one end to coincide with a corresponding perforation in the rod, a lever fulcrumed to the sleeve, and a pin pivoted to one end of the lever to enter the perforations in the sleeve and rod, a catch device fixed to the sleeve to engage the end of the lever when the pin is withdrawn, a spring fixed to the sleeve to retain the lever disengaged from the catch and the pin projected through the perforations in the sleeve and rod, and a cord on the end of the lever for actuating the lever and withdrawing the pin and compressing the spring and latching the lever to the catch, in the manner set forth, for the purposes stated.

2. The sleeve C, having perforations at its upper end corresponding with a perforation in a sliding rod extended through the sleeve, a lever $f$, fulcrumed to the central part of the sleeve, a pin $f'$, pivoted to the upper end of the lever, a catch $g$, fixed to the sleeve to engage the lower end of the lever, and a cord attached to the outwardly-bent top end of the lever, arranged and combined with rods $n$ and levers $m$, pivoted to a rotating shaft and carrying pawls $k$, to engage a ratchet-wheel on the same shaft, substantially as shown and described, for the purposes stated.

STEWARD A. LUM.
JOHN LISCOM.

Witnesses:
   A. R. KITTS,
   J. DICKINSON.